US012573407B2

(12) United States Patent
Nejat et al.

(10) Patent No.: US 12,573,407 B2
(45) Date of Patent: Mar. 10, 2026

(54) QUICK AUDIO PROFILE USING VOICE ASSISTANT

(71) Applicant: Sony Group Corporation, Tokyo (JP)

(72) Inventors: Mahyar Nejat, San Diego, CA (US);
Arturo Jordan, San Diego, CA (US);
Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 162 days.

(21) Appl. No.: 18/049,984

(22) Filed: Oct. 26, 2022

(65) Prior Publication Data

US 2024/0144938 A1      May 2, 2024

(51) Int. Cl.
G10L 17/22          (2013.01)
G06F 3/16          (2006.01)

(52) U.S. Cl.
CPC ................ G10L 17/22 (2013.01); G06F 3/16 (2013.01)

(58) Field of Classification Search
CPC .................................... G10L 17/22; G06F 3/16
See application file for complete search history.

(56) References Cited

U.S. PATENT DOCUMENTS

| | | | | |
|---|---|---|---|---|
| 7,529,545 | B2 * | 5/2009 | Rader ..................... | H04R 25/70 |
| | | | | 455/268 |
| 8,738,737 | B2 | 5/2014 | Baldini et al. | |
| 9,147,296 | B2 | 9/2015 | Ricci | |
| 9,547,692 | B2 | 1/2017 | Poulsen | |

| | | | | |
|---|---|---|---|---|
| 9,680,438 | B2 | 6/2017 | Raz et al. | |
| 9,858,916 | B2 * | 1/2018 | An .......................... | G10L 21/02 |
| 9,858,943 | B1 * | 1/2018 | Carlsson ................. | H04S 1/002 |
| 9,933,990 | B1 | 4/2018 | Guterman et al. | |
| 10,405,095 | B2 | 9/2019 | Eichfeld et al. | |
| 10,506,067 | B2 | 12/2019 | Lederman et al. | |
| 10,582,044 | B2 | 3/2020 | Allison | |
| 10,595,135 | B2 | 3/2020 | Li et al. | |
| 10,993,056 | B1 | 4/2021 | Schumaier | |
| 11,516,545 | B1 | 11/2022 | Knox | |
| 11,622,197 | B2 | 4/2023 | Nejat et al. | |
| 11,727,947 | B2 | 8/2023 | Garcia | |
| 11,736,860 | B2 | 8/2023 | Lang et al. | |
| 11,778,378 | B2 | 10/2023 | Agustin et al. | |
| 11,924,613 | B2 | 3/2024 | Sahgal | |
| 2003/0128859 | A1 | 7/2003 | Greene et al. | |
| 2005/0094822 | A1 | 5/2005 | Swartz | |
| 2005/0260978 | A1 | 11/2005 | Rader et al. | |

(Continued)

FOREIGN PATENT DOCUMENTS

WO      WO-2023010014 A1 *    2/2023

OTHER PUBLICATIONS

"Easy to integrate Hearing Wellbeing Technology into any product", Mimi Hearing Wellbeing, retrieved on Nov. 11, 2022 from https://mimi.io/application.

(Continued)

*Primary Examiner* — Brian L Albertalli
(74) *Attorney, Agent, or Firm* — John M. Rogitz; John L. Rogitz

(57)          ABSTRACT

An app a configuring device is used for generating an audio profile of a first user. A display device such as a TV or a standalone speaker is configured with the audio profile so that demanded audio is played in an altered form than demanded according to the audio profile.

19 Claims, 20 Drawing Sheets

(56) References Cited

U.S. PATENT DOCUMENTS

| | | | |
|---|---|---|---|
| 2006/0215844 A1* | 9/2006 | Voss | H04R 25/70 |
| | | | 381/60 |
| 2009/0307590 A1 | 12/2009 | Frater et al. | |
| 2010/0239100 A1* | 9/2010 | Steinbuss | H04R 25/407 |
| | | | 381/313 |
| 2010/0303249 A1* | 12/2010 | Semcken | G10L 21/02 |
| | | | 381/103 |
| 2011/0100127 A1* | 5/2011 | Beck | A61B 5/121 |
| | | | 73/585 |
| 2011/0200214 A1 | 8/2011 | Knox et al. | |
| 2013/0303940 A1* | 11/2013 | Saly | A61B 5/123 |
| | | | 600/559 |
| 2013/0337786 A1* | 12/2013 | Park | H04R 25/70 |
| | | | 455/414.1 |
| 2013/0343584 A1* | 12/2013 | Bennett | A61J 1/00 |
| | | | 381/317 |
| 2014/0112485 A1 | 4/2014 | Lockett et al. | |
| 2014/0309892 A1 | 10/2014 | Ricci | |
| 2015/0012123 A1 | 1/2015 | Irmler | |
| 2015/0025662 A1 | 1/2015 | Di Censo et al. | |
| 2015/0025663 A1 | 1/2015 | Cameron et al. | |
| 2015/0121215 A1 | 4/2015 | Wohlert et al. | |
| 2016/0044406 A1 | 2/2016 | Oishi et al. | |
| 2016/0139875 A1 | 5/2016 | Tripplett | |
| 2016/0165371 A1 | 6/2016 | Sheen | |
| 2016/0188285 A1 | 6/2016 | Luk et al. | |
| 2016/0196108 A1 | 7/2016 | Selig et al. | |
| 2016/0234606 A1 | 8/2016 | Selig et al. | |
| 2016/0239253 A1* | 8/2016 | Staffaroni | G10L 21/0364 |
| 2016/0381476 A1 | 12/2016 | Gossain et al. | |
| 2017/0005634 A1 | 1/2017 | Raz | |
| 2017/0223461 A1 | 8/2017 | Raz et al. | |
| 2017/0247000 A1 | 8/2017 | Ricci | |
| 2017/0300292 A1 | 10/2017 | Torrini et al. | |
| 2018/0239581 A1 | 8/2018 | Guterman et al. | |
| 2018/0270590 A1 | 9/2018 | Rountree, Sr. | |
| 2019/0227765 A1 | 7/2019 | Soifer et al. | |
| 2019/0231233 A1* | 8/2019 | Turner | A61B 5/123 |
| 2020/0065058 A1* | 2/2020 | Clark | H04R 1/1041 |
| 2020/0137446 A1 | 4/2020 | Sprenger et al. | |
| 2020/0152197 A1 | 5/2020 | Penilla et al. | |
| 2020/0238933 A1 | 7/2020 | Sobhany | |
| 2020/0250588 A1 | 8/2020 | Zellner | |
| 2020/0382883 A1* | 12/2020 | Woodruff | H04R 25/04 |
| 2021/0051422 A1 | 2/2021 | Clark | |
| 2021/0287692 A1* | 9/2021 | Cheung | G10L 21/0208 |
| 2021/0289070 A1* | 9/2021 | Thomson | H04M 1/72475 |
| 2021/0377687 A1 | 12/2021 | Berger et al. | |
| 2021/0392444 A1 | 12/2021 | Li et al. | |
| 2021/0409877 A1 | 12/2021 | Clark et al. | |
| 2022/0070583 A1 | 3/2022 | Nejat et al. | |
| 2022/0169186 A1 | 6/2022 | Laury et al. | |
| 2022/0295189 A1* | 9/2022 | Sahgal | H04R 25/353 |
| 2022/0417647 A1* | 12/2022 | Sun | H04R 25/505 |
| 2023/0050817 A1* | 2/2023 | Gökay | A61B 5/6803 |
| 2023/0068527 A1 | 3/2023 | Mahlmeister et al. | |
| 2023/0073037 A1 | 3/2023 | Candelore | |
| 2023/0074058 A1 | 3/2023 | Gean et al. | |
| 2023/0179934 A1* | 6/2023 | Gavish | G10L 17/00 |
| | | | 381/313 |
| 2023/0222156 A1 | 7/2023 | Jenabzadeh | |
| 2023/0262425 A1 | 8/2023 | Frolovichev et al. | |
| 2023/0263970 A1 | 8/2023 | Kaczkowski | |
| 2023/0281244 A1 | 9/2023 | Woods | |
| 2023/0297324 A1 | 9/2023 | Yu et al. | |
| 2023/0300531 A1* | 9/2023 | Rothschild | H04R 25/356 |
| | | | 381/104 |
| 2023/0326471 A1 | 10/2023 | Chung | |
| 2023/0393867 A1 | 12/2023 | Penilla et al. | |
| 2023/0394886 A1 | 12/2023 | Carrigan et al. | |
| 2024/0089515 A1 | 3/2024 | Knox | |
| 2024/0112690 A1 | 4/2024 | Faubel et al. | |
| 2024/0194216 A1* | 6/2024 | Jain | H03G 9/025 |
| 2024/0231749 A1 | 7/2024 | Candelore et al. | |
| 2024/0406647 A1* | 12/2024 | Yang | H04R 29/001 |

OTHER PUBLICATIONS

"Frequently asked questions", Mimi Hearing Wellbeing, retrieved on Nov. 11, 2022 from https://mimi.io/faq.

"Your Hearing Your Sound", Mimi Hearing Wellbeing, retrieved on Nov. 11, 2022 from https://mimi.io.

"Our Hearing Test", 2021, Mimi Health GmbH. Retrieved from https://mimi.health/hearing-test.

Candelore et al., "Configuration of Platform Application With Audio Profile of a User", file history of related U.S. Appl. No. 18/152,380, filed Jan. 10, 2023.

Nejat et al., "Quick Audio Profile Using Voice Assistant", file history of related U.S. Appl. No. 18/049,984, filed Oct. 26, 2022.

Nejat et al., "Quick and Easy Audio Profile Creation and Use", related U.S. Appl. No. 18/050,419, Final Office Action dated Apr. 11, 2024.

Nejat et al., "Quick and Easy Audio Profile Creation and Use", related U.S. Appl. No. 18/050,419, Applicant's response to Non-Final Office Action filed Jun. 20, 2023.

Nejat et al., "Quick and Easy Audio Profile Creation and Use", related U.S. Appl. No. 18/050,419, Non-Final Office Action dated Apr. 13, 2023.

Nejat et al., "Quick and Easy Audio Profile Creation and Use", file history of related U.S. Appl. No. 18/050,419, filed Oct. 27, 2022.

Candelore et al., "Configuration of Platform Application With Audio Profile of a User", related U.S. Appl. No. 18/152,380, Final Office Action dated Jun. 12, 2025.

Candelore et al., "Configuration of Platform Application With Audio Profile of a User", related U.S. Appl. No. 18/152,380, Non-Final Office Action dated Feb. 14, 2025.

Candelore et al., "Configuration of Platform Application With Audio Profile of a User", related U.S. Appl. No. 18/152,380, Applicant's response to Non-Final Office Action filed Mar. 20, 2025.

* cited by examiner

300 — Download Audio Profile App To Phone

302 — Present UIs On Phone

304 — Generate Audio Profile Using App

306 — Store

400 — Receive Trigger To Load Audio Profile To Device

402 — Retrieve Audio Profile

404 — Configure Device With Audio Profile

406 — Play Audio On Device Using Audio Profile

Audio-Based Set Up

1400 — Receive User Voice Command To Set Up Profile

1402 — Audibly Query User Re Which Device

1404 — Audibly Query User Re Source

1406 — Configure Designated Device With User's Audio Profile

1408 — Play Audio On Device Per Audio Profile

1500 — Identify Audio Profile

1502 — Enhance Frequencies That The Profile User Has A Hard Time Hearing

1504 — Resulting Audio Is More Intelligible To User Whose Profile Is Used

Select Profile

→ Audio Profile For Hearing Aids — 1802

→ Audio Profile For TV — 1804

1800

2300 — Present List Of Audio Profiles On Device Created On

2302 — Present Parallel Audible UI

2304 — Receive User Selection

2306 — Establish Profile On Selected Device(s)

2400 — Present List Of Profiles On Display Device

2402 — Present Parallel Audible UI

2404 — Receive User Selection

2406 — Establish Profile

QUICK AUDIO PROFILE USING VOICE ASSISTANT

FIELD

The present application relates generally to quickly establishing audio profiles for devices, e.g., using voice assistance.

BACKGROUND

Many consumer electronics (CE) devices in a home are network connected. As understood herein, many such devices can benefit in providing good audio by being programmed with audio profiles tailored to a person's specific hearing needs.

SUMMARY

To enable a person to quickly and easily establish an audio profile for a TV, speaker, or other audio device, an audio profile is created using an app on the user's cell phone and stored. It is then downloaded to the TV or speaker (and stored, if desired). The profile in the recipient device can be one of many that can be interchanged quickly on-the-fly. A voice assistant may enable the person to pick an audio profile from a list of audio profiles or user interface, either on the TV or the device the profile was created on. Using either method, voice assistant or UI, the profile can be downloaded from a mobile or PC device where the profile was created, or from the cloud where a previously created profile was uploaded and stored. A dual UI using voice and visual on-screen options makes the profiles accessible to most people. A prompt may be provided asking if the person wants to keep a setting, and if the person couldn't hear the question with the new settings, then the system may automatically revert to the old audio settings.

Accordingly, an assembly includes at least one processor configured with instructions to present on at least one display at least one user interface (UI) listing plural audio profiles. The instructions are executable to play on at least one speaker instructions related to selecting at least one of the audio profiles being presented on the display, and establish at least a first one of the audio profiles in at least a first device according to selection from the UI or voice input.

The instructions may be embodied on an application in a mobile phone or on an application in a TV. In examples, the instructions are executable to play demanded audio on the first device according to the first audio profile.

Without limitation, the first device can include, e.g., a TV or a standalone speaker. The first audio profile may be associated with hearing aids or with a headphone.

In another aspect, a method includes receiving a trigger for configuring a playback device with an audio profile, presenting a list of audio profiles responsive to the trigger, and configuring the playback device with an audio profile responsive to selection from the list.

In another aspect, a device includes at least one computer storage that is not a transitory signal and that in turn includes instructions executable by at least one processor to present audible instructions or visual instructions or both audible and visual instructions on at least one selector device for selecting an audio profile for a first user. The instructions are executable to receive selection of an audio profile responsive to the audible instructions or visual instructions, and configure at least one playback apparatus with the audio profile to play demanded audio consistent with the audio profile.

In other aspects, an assembly includes at least one processor configured with instructions to present on at least one device at least one prompt for a user for input representing hearing thresholds of the user for each of plural frequencies. The instructions are executable to, using the input, generate an audio profile, and store the audio profile for retrieval to a playback apparatus in presenting demanded audio.

The instructions may be embodied on an application in a mobile phone or on an application in a TV.

In some examples the instructions can be executable to play demanded audio on the playback apparatus according to the first audio profile. The playback apparatus can include a TV or a standalone speaker. The audio profile may be associated with hearing aids or with a headphone.

In another aspect, a method includes executing an app in a wireless communication device (WCD) for generating an audio profile of a first user. The method also includes configuring a display device or a standalone speaker or both the display device and standalone speaker with the audio profile, and playing demanded audio on the display device or the standalone speaker or both the display device and standalone speaker according to the audio profile.

In another aspect, a device includes at least one computer storage that is not a transitory signal and that in turn includes instructions executable by at least one processor to present audible instructions or visual instructions or both audible and visual instructions on at least one wireless communication device (WCD) for generating an audio profile for a first user, and implement the audio profile on at least one playback apparatus to play demanded audio consistent with the audio profile.

In example embodiments, the instructions may be executable to attenuate at least one frequency in demanded audio according to the audio profile such that the at least one frequency is played at a lower volume than demanded. In other examples the instructions may be executable to amplify at least one frequency in demanded audio according to the audio profile such that the at least one frequency is played at a louder volume than demanded.

The details of the present application, both as to its structure and operation, can be best understood in reference to the accompanying drawings, in which like reference numerals refer to like parts, and in which:

BRIEF DESCRIPTION OF THE DRAWINGS

FIGS. 23 and 24 illustrate example logic in example flow chart format for visible and audible selection of an audio profile using a display device such as a TV;

DETAILED DESCRIPTION

Figure 1:
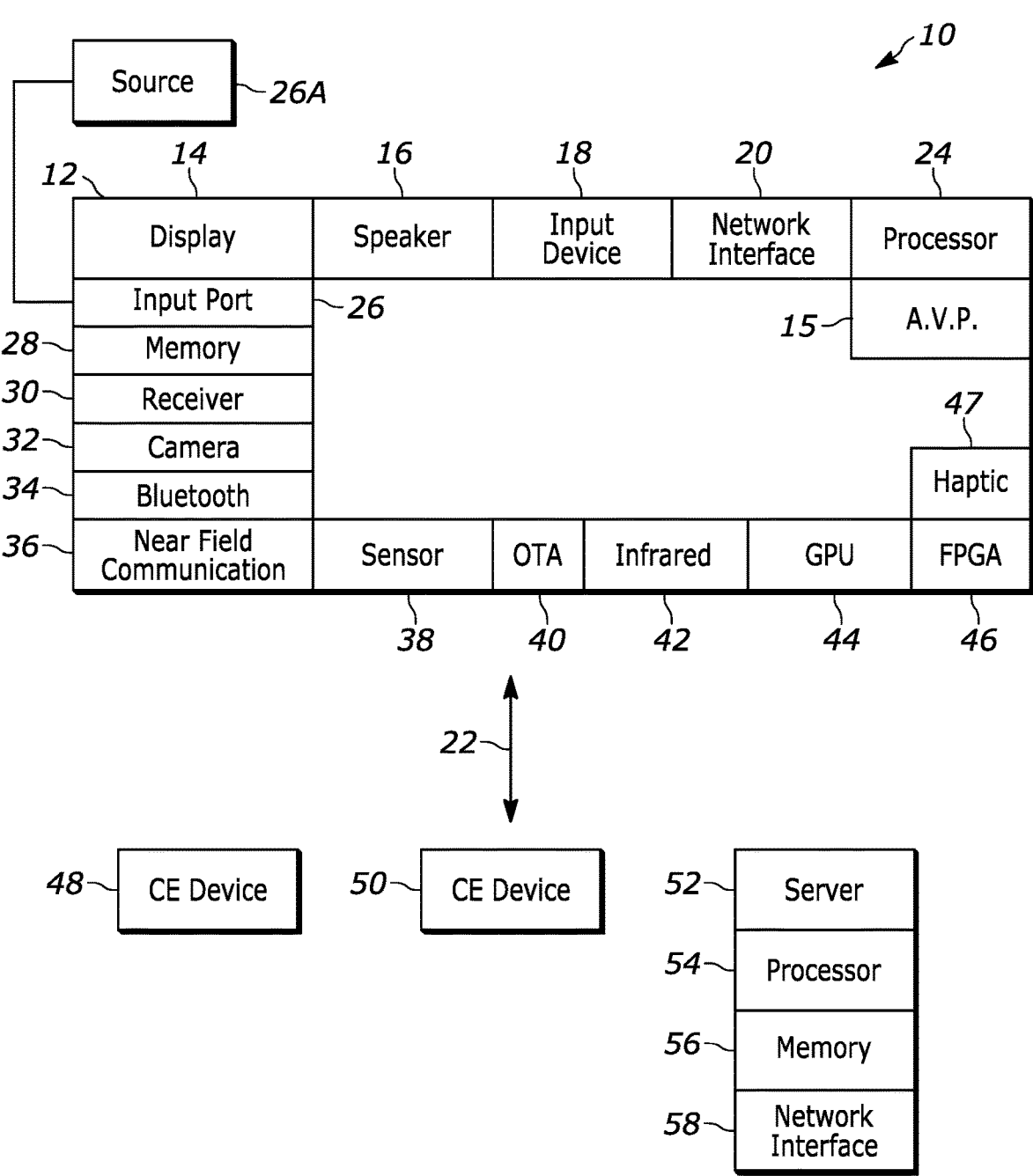
FIG. 1 is a block diagram of an example system in accordance with present principles.

This disclosure relates generally to computer ecosystems including aspects of consumer electronics (CE) device networks such as but not limited to home entertainment networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, display devices such as televisions such as the Sony Bravia TVs (e.g., smart TVs, Internet-enabled TVs), computers such as laptops and tablet computers, standalone speakers, home theater audio/video (AV) devices, and mobile devices including the Sony Xperia mobile phone, smart phones and additional examples discussed below. These client devices may operate with a variety of operating environments. For example, some of the client computers may employ, as examples, Linux operating systems, operating systems from Microsoft, or operating systems from Apple, Inc. or Google. These operating environments and in addition with software drivers and a hardware abstraction layer (HAL) may be used to execute one or more browsing programs, such as a browser made by Microsoft or Google or Mozilla or other Internet networked applications that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box or dongle controlling a TV). The AVD 12 alternatively may also be a computerized Internet enabled ("smart") phone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include an analog audio output port 15 to drive one or more external speakers or headphones, and may include one or more internal speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a smart speaker assembly or other device and may not have a video display. Or, the first CE device 48 may include a computer game console that can be used to send computer game audio and video to the AVD 12 via commands sent directly to the AVD 12 and/or through the below-described server. A second CE device 50 may include similar components as the first CE device 48. In the example shown, the second CE device 50 may be configured as a remote control (RC) for the AVDD 12. Or, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or more devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi or Ethernet transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Figure 2:
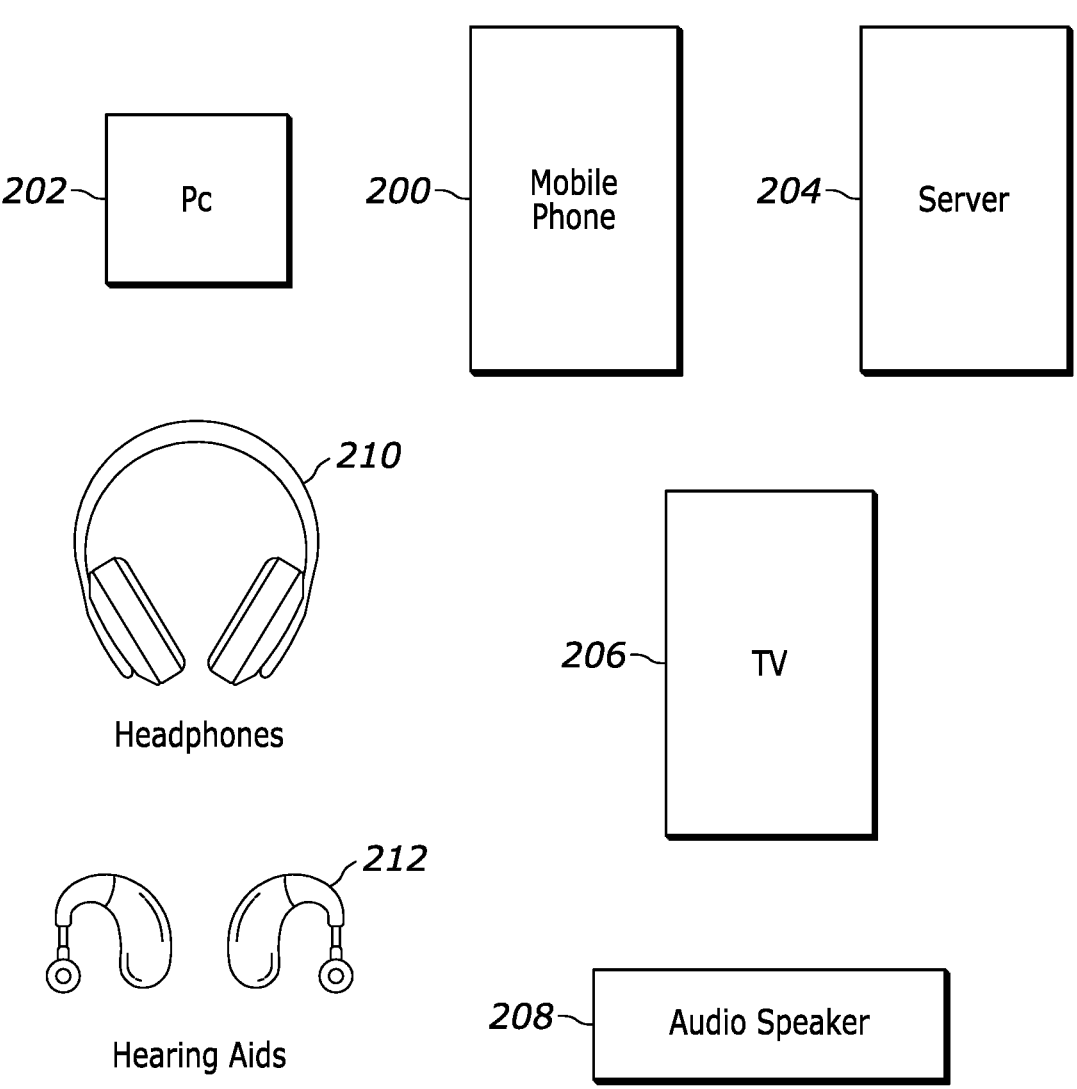
FIG. 2 illustrates an example specific system.

FIG. 2 illustrates an example specific system the devices of which may incorporate some or all of the components in FIG. 1. The devices shown in FIG. 2 may communicate with each other via wired and/or wireless paths such as Wi-Fi, Bluetooth®, Universal Serial Bus (USB), or HDMI Audio Return Channel (ARC). The communication may be peer-to-peer, or over a network such as a local area network (LAN) or wide area network (WAN).

In the example shown, a mobile device 200 such as a mobile phone may communicate with a computer 202 such as a personal computer (PC), laptop, tablet, etc. and with at least one server 204, which may be a cloud-based server or local server implemented by, e.g., a computer game console. The system may further include one or more audio visual devices 206 such as a TV, one or more standalone audio speakers 208, or an audio/video (AV) home theater system 214. It should be noted that standalone audio speakers 208 are computerized AVD 12 in their own right with Processor 24, Input Port 26, memory 28 and Bluetooth interface, and can independently execute applications. A user may be able to hear sound through the TV's 216 internal speakers, attached sound bar audio speaker 2008, or through the AV system 214. The AV system 214 may have different speaker arrangements depending on whether surround sound or stereo sound is being listened to, and the AV system 214 typically can control multiple zones. For example, outside and inside speakers would typically be in different zones. And, for the inside speakers, there could be family room and recreation room zones. A user of the system may even use passive or active headphones 210 and/or hearing aids 212 to better hear audio played by the system. Active headphones 210 and active speakers 208, as opposed to passive versions of those devices, are battery driven and often able to store audio files internally, and can render audio from files stored internally or from an attached USB storage device, and can often amplify audio, and can be network connected using Bluetooth to an external source of audio. Logic implemented herein may be executed by any one or more of the processors of the devices shown in FIG. 2 alone or in cooperation with other processors.

Figure 3:
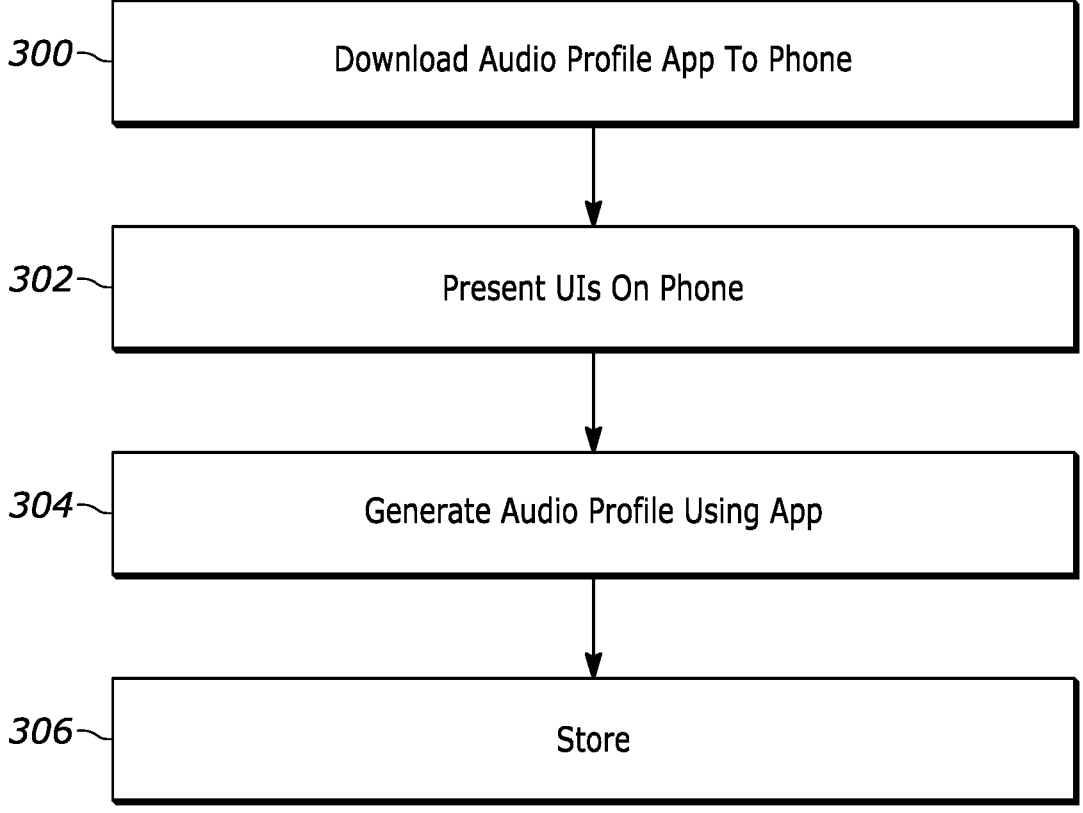
FIG. 3 illustrates example logic in example flow chart format for creating an audio profile.

FIG. 3 illustrates overall logic for creating one or more audio profiles that are tailored to a specific user. Commencing at block 300, an executable application ("app") is provided to the phone 200 shown in FIG. 2 by, e.g., downloading the app to the phone from the Internet. The app performs a hearing test for each ear or depending on the configuration to both ears at the same time. The user may be asked to use earplugs for the ear not under test. Note that alternatively, the app may be downloaded to the TV 206 shown in FIG. 2, to the active speaker 208, to the active headphones 210, to hearing aids 214, or to the AV system 214, or other device for execution of the logic of FIG. 3 by that device.

Moving to block 302 and assuming the phone 200 is the device being used, user interfaces (UI) are presented on the phone if desired in both visible (onscreen) and audible (played on speakers) format. The user generates his audio profile at block 304 by means of the UI, and the profile is stored at block 306 in the device used to create the audio profile, the server 204 shown in FIG. 2 and/or other device in FIG. 2.

Figure 4:
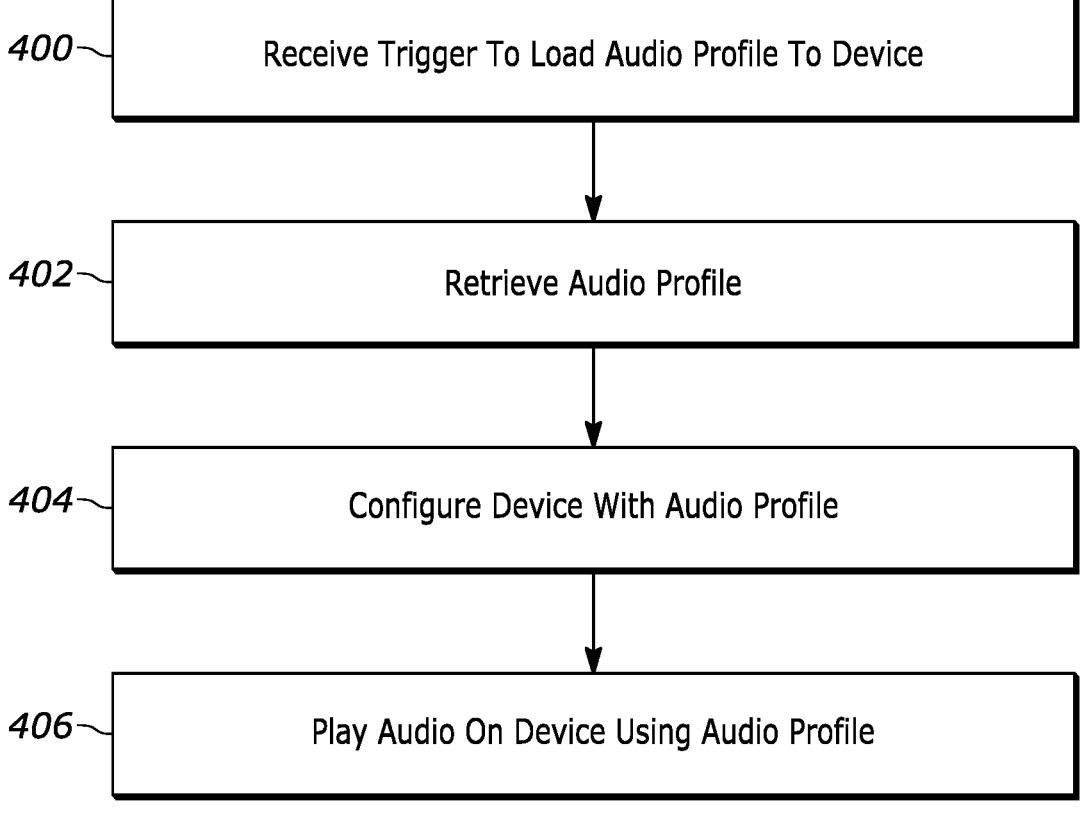
FIG. 4 illustrates example logic in example flow chart format for using the audio profile.

FIG. 4 illustrates overall logic for using an audio profile tailored to a specific user. Commencing at block 400, a trigger is received to load an audio profile to a specific device. The trigger may be, e.g., a user voice command, a user input command to a visible UI, an audio device being turned on and searching for audio profiles based on, e.g., face recognition of a user as imaged by a camera or based on Bluetooth connection with a potential profile-storing device, etc. The audio profile for the user is retrieved at block 402 and an audio device configured at block 404 with the profile. The audio device plays audio at block 406 using the audio profile. Note that the audio profile may be generated as described in FIGS. 5-10 using the built-in speakers of a cellphone however headphones, external speakers, or even hearing aids may be connected to the cellphone when conducting the hearing test and not just using the cell phone's speaker. Each device can have various speaker configurations which can be added to a list of potential audio profiles for selection from the list as described herein.

FIGS. 5-10 illustrate example UIs that may be presented on, e.g., a display of the phone 200 to create an audio profile. The UIs also or alternatively may be audibly presented, e.g., on speakers of the phone. It is to be understood that while FIGS. 5-10 illustrate audio profiles in terms of tones, e.g., sound frequencies, that can and cannot be heard by a particular user, an audio profile may include other parameters as well. For instance, for hearing aids (over the ear, for example) there may be multiple microphones—one in front and one in back. Part of an audio profile includes identifying which audio stream (front or back) to emphasize. Audio profiles depend on the specific device and speaker playback system that the profiles are to be implemented on, e.g., TV speaker, headphones, AV system, external speakers, hearing aids, and Augmented Reality (AR) glasses. Audio profiles may include certain personal preferences such when playing music, boosting bass over treble.

Figure 5:
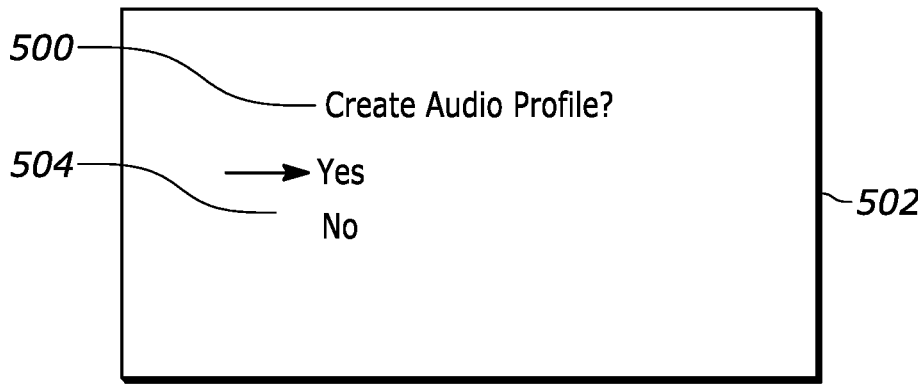
FIGS. 5-10 illustrate screen shots of example user interfaces (UI) that may be used in creating audio profiles.

In FIG. 5, a prompt 500 appears on a screen 502 of the phone 200 for the user to create an audio profile. This prompt may be presented, for example, upon completion of download and installation of the app. Selectors 504 are presented and selectable to indicate whether the user wishes to perform a hearing test and create an audio profile at that time.

Figure 6:
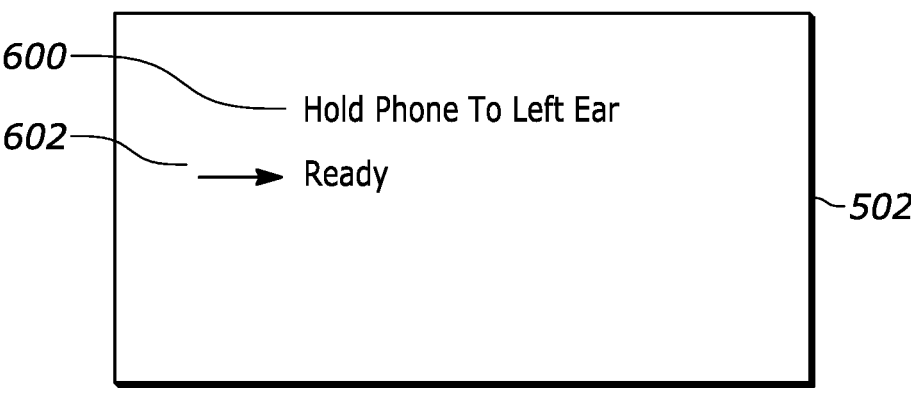
Figure 7:
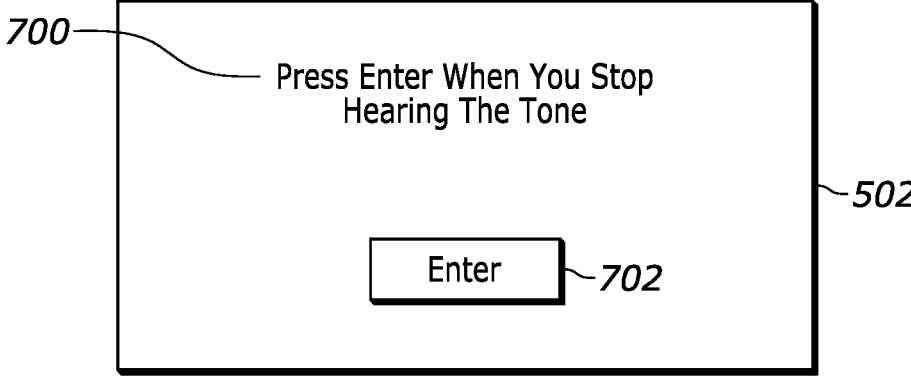

Assuming the user has decided to create an audio profile, the user may be prompted at 600 in FIG. 6 to hold the phone next to an ear and select at 602 when the user is ready. When ready, as shown in FIG. 7 a test tone at a first frequency is played on the phone along with a prompt 700 for the user to select at 702 when the user stops hearing the test tone, which can be played at a continuously diminishing volume. Alternatively, the tone may start quiet and grow in volume in which case the user selects 702 when the user starts to perceive the tone. In this open-air test with the cell phone or with the TV or standalone speaker, the user may be asked to wear earplugs, or a headphone pressed to the ear that is not being tested. Alternatively, the user may be asked to turn his head so that the ear not being tested is further away from the audio source. In addition, rather than separate out the ears, left or right, they may be tested together. This makes sense for a TV or standalone speaker where stereoscopic separation may not be possible or difficult because the left and right speakers are too close together causing both ears to hear sound.

Figure 8:
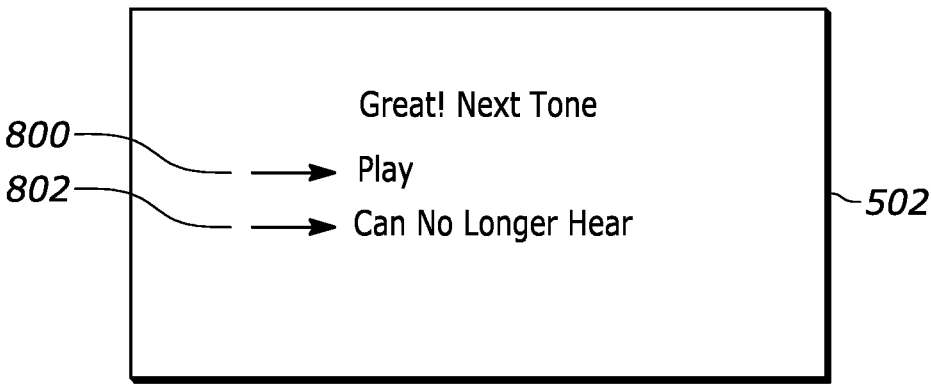
Figure 9:
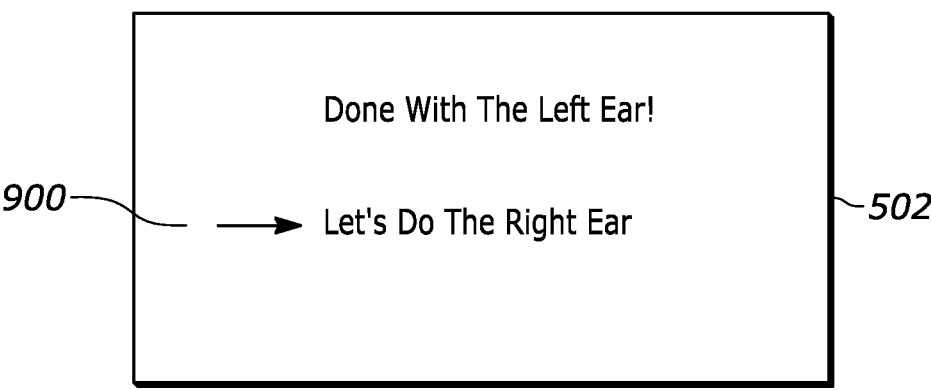
Figure 10:

Once the user selects at 702, another tone at a different frequency may be played, if desired pending selection at 800 in FIG. 8 to play the next tone. When the user can no longer hear the next tone (or can begin to hear the tone as the case may be), the user indicates such by selecting the selector 802.

The process continues to individually play a succession of different frequencies with the user indicating hearing thresholds as described for each tone. When all tests are complete for the first ear, as indicated at 90 in FIG. 9 the user is prompted to switch the phone to the other ear and the processes and UI of FIGS. 5-8 are repeated for the other ear. When testing of the other ear is complete, the user is advised at 1000 in FIG. 10 that the audio profile, e.g., audiogram, has been generated. A list 1002 of storage locations for the audio profile may be presented and the user can select one or more of the locations from the list to store the audio profile at the selected location(s).

Figure 11:
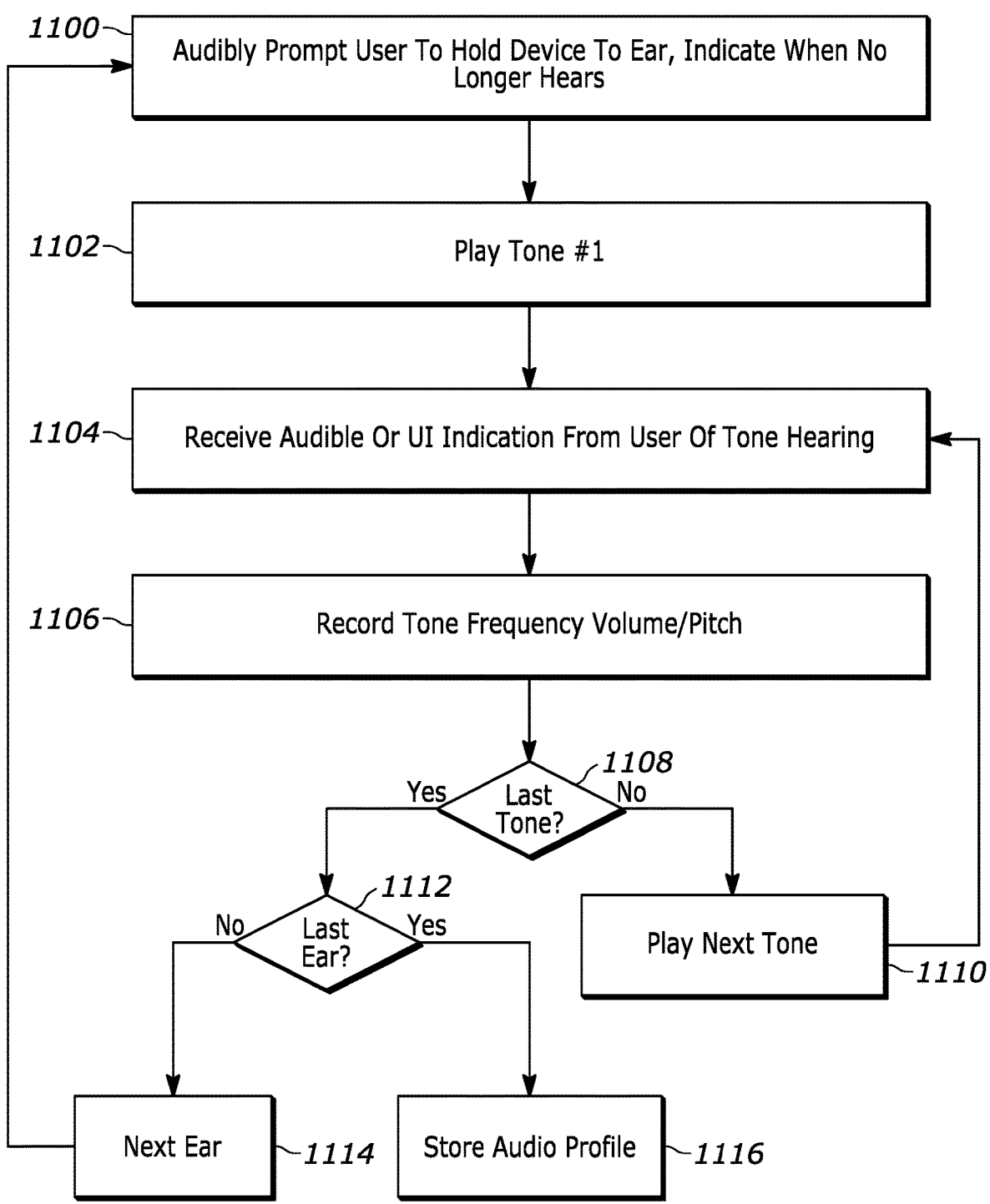
FIG. 11 illustrates example logic in example flow chart format for audio-based creation of an audio profile.

FIG. 11 illustrates that the process above may be executed audibly in lieu of or in addition to using visible UIs. This is appropriate for situations where the user may be blind or visually impaired and cannot see a visible UI and a screen reader is not readily available. An audible process is also appropriate for situations where the device used to perform the hearing test does not have display capability, e.g., headphones, standalone speaker, or possibly an A/V system with simple status readouts. Commencing at block 1100, the user is audibly prompted to hold the phone next to the first ear and indicate when the tone can no longer be heard or can be first heard. The first tone is then played at block 1102 and the user's audible and/or UI-entered indication of when it is initially heard (or can no longer be heard) is received at block 1104.

Proceeding to block 1106 the information regarding the tone (frequency and other parameters if desired) is recorded, along with which ear is under test and the volume of the tone at the time user indication was received at block 1104. If it is determined at decision diamond 1108 that not all tones have yet been tested, the logic moves to block 1110 to retrieve and play the next tone and then receive user input as described at block 1104. When all tones for the ear under test have been played, decision diamond 1112 indicates that it is determined if both ears have been tested, and if not, the user is prompted audibly a block 1114 to switch ears and the process loops back to bock 1100 to repeat for the other ear. When both ears have been tested the logic moves to block 1116 to store the audio profile as described previously, with user voice indications being received to indicate where to store the profile.

Figure 12:
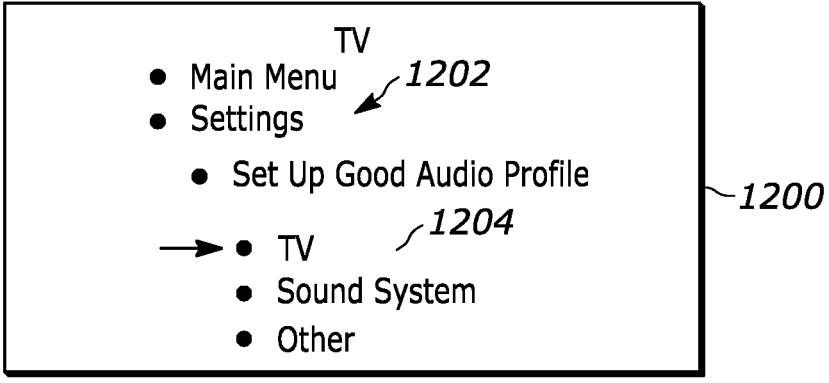
FIGS. 12 and 13 illustrate screen shots of example UI that may be used in selecting and applying audio profiles.

FIG. 12 illustrates a UI that may be presented on a display 1200 such as the TV shown in FIG. 2. From a nested set of menus 1202 a setup setting may be presented listing devices 1204 that the user can select from to configure the selected device(s) with the audio profile for the user. As shown, the devices that may be selected include the TV, AV system, standalone active speaker, or other device such as the PC or active headphones or hearing aids shown in FIG. 2.

Figure 13:
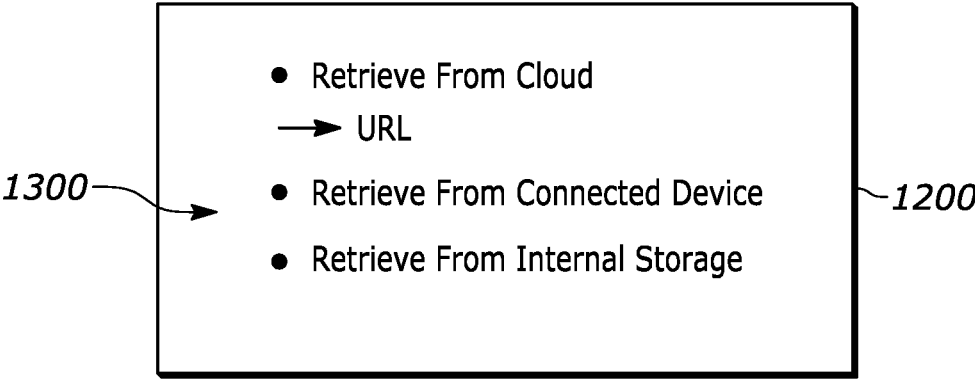

FIG. 13 illustrates a UI that may be presented on a display 1200 such as the TV shown in FIG. 2. A list 1300 of storage locations may be presented from which the user can select to retrieve a previously-stored audio profile to be implemented on the device(s) selected from FIG. 12. As shown, the potential storage locations include a cloud server, in which case the user can enter the network address of the server or simply select a link that is already in the UI, or a device connected to the TV via Bluetooth or other link, or internal storage of the TV. Audio profiles associated with hearing aids or headphones may be stored at the listed locations.

Figure 14:
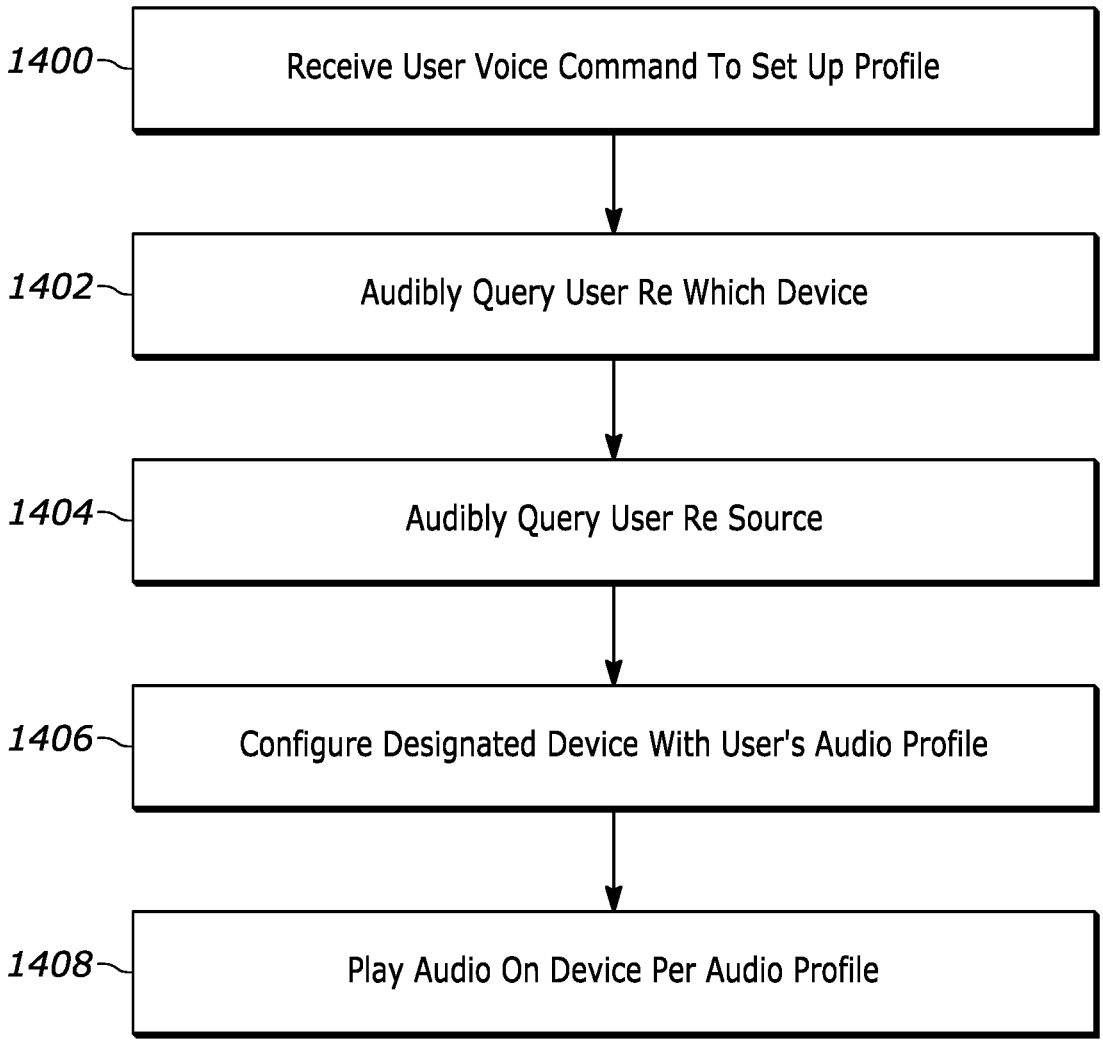
FIG. 14 illustrates example logic in example flow chart format for audio-based selection of audio profiles.

FIG. 14 illustrates an audible implementation of FIGS. 12 and 13. Commencing at block 1400 a user voice command is received to set up an audio profile. Proceeding to block 1402, an audible query may be played on a speaker for the user to utter the name of the device the user wishes to use the audio profile. An audible query also may be played at block 1404 for the user to utter the name of the source from whence the audio profile is to be retrieved.

Moving to block 1406, responsive to the user's voice replies to the queries at blocks 1402 and 1404, the designated device(s) are configured with the audio profile of the user as obtained from the designated storage locations. Audio subsequently is played on the user-designated devices at block 1408 according to the user's audio profile.

Figures 15, 16, 17, 18:
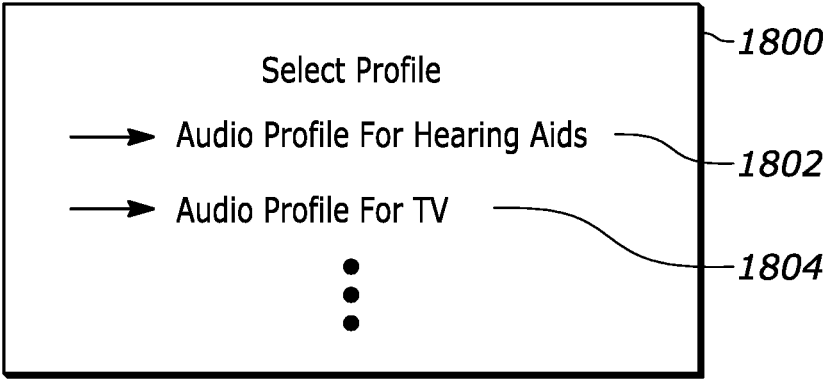
FIGS. 15-17 illustrate example logic in example flow chart format for using audio profiles during playback.
FIG. 18 illustrates an example UI for selecting an audio profile.

FIGS. 15-17 illustrate example techniques for use of an audio profile in a device playing audio. Commencing at block 1500 in FIG. 15, the processor of the device accesses or otherwise identifies the audio profile to be employed. The profile can be established using any of the techniques herein. In examples, the device may include a camera that images the user and face recognition software may be employed to correlate the recognized user to a stored audio profile. Or, the user may orally identify himself, or enter his ID into the device using an input device such as a remote control or keyboard or touchscreen.

Proceeding to block 1502 of FIG. 16, frequencies in demanded audio that the audio profile indicates cannot be heard (or heard sufficiently) by the user, may be enhanced in demanded audio before playing. And at block 1504, of FIG. 17 the resulting audio is rendered in a form that is more intelligible to the user.

FIG. 18 illustrates a UI that may be presented on a display 1800 such as any display herein for selecting a device on which to play audio according to the audio profile. As shown, the user may select at 1802 to apply the audio profile to hearing aids. This is an audio profile that was characterized using hearing aids during the hearing text. The user may select at 1804 to play the audio profile to a TV. This is an audio profile that was characterized using TV during the hearing test. Other devices may be selected from the list shown in FIG. 18.

Figure 19:
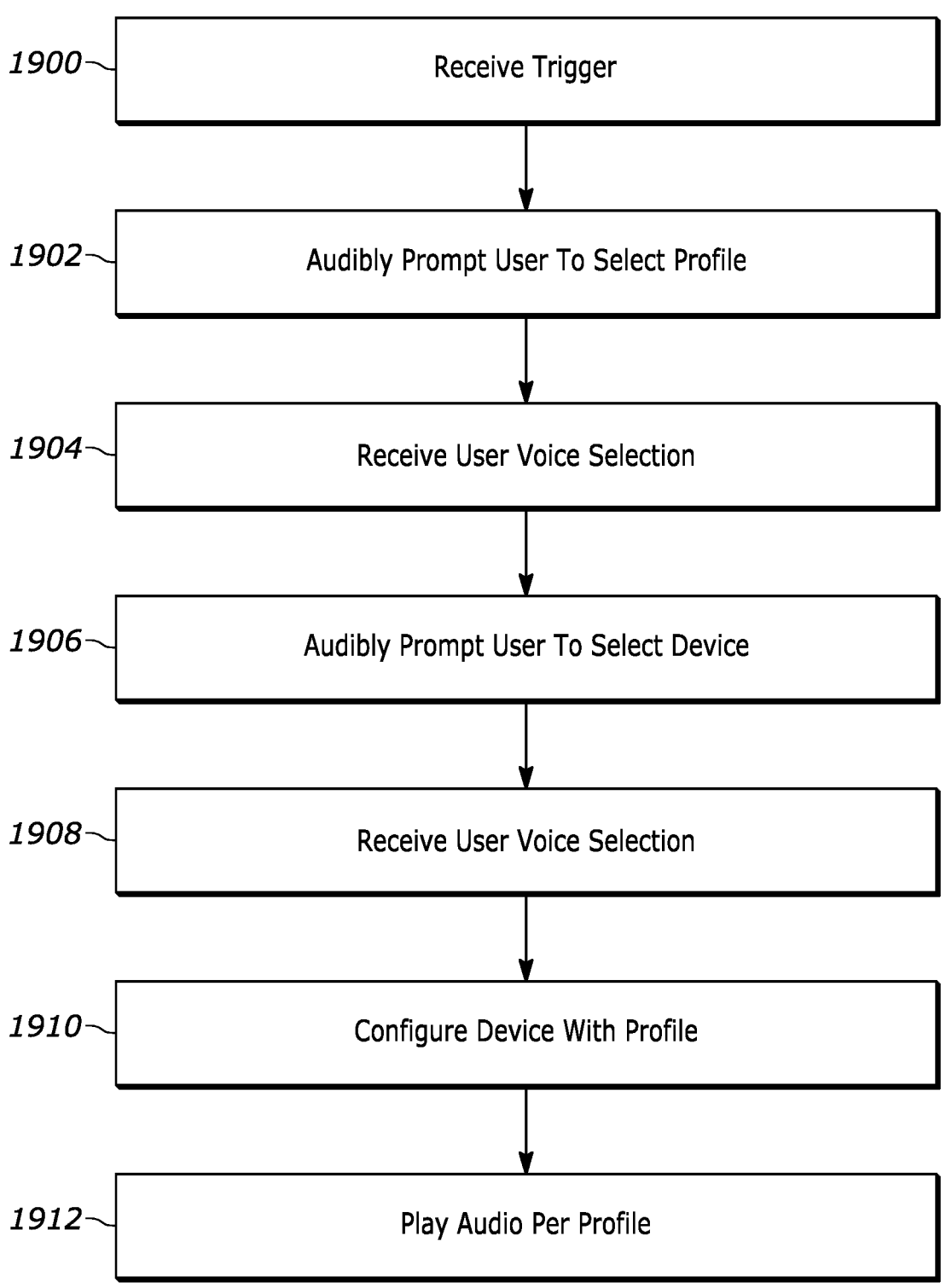
FIG. 19 illustrates example logic in example flow chart format for audible selection and use of audio profiles.

FIG. 19 illustrates an audible implementation for selecting profiles and devices. Commencing at block 1900 a trigger is received. The trigger may be a voice command to select an audio profile, or initial power on of a device, or completion of installation of the audio profile app discussed above, or device discovery via Bluetooth for instance, or direct user input from a UI on a display for example using a remote control, etc.

Responsive to the trigger, at block 1902 the user is audibly prompted using a speaker to select an audio profile, such as "do you want to implement your hearing aid profile or your headphones profile?" The user's voice selection is received at block 1904. Moving to block 1906, the user is audibly prompted to select a device on which to implement the selected profile, e.g., "do you want to implement your profile on the TV or on the speaker system or both?" the user's reply is received at block 1908. The selected device is configured with the selected audio profile at block 1910 and demanded audio subsequently played at block 1912 on the selected device according to the selected audio profile.

Figure 20:
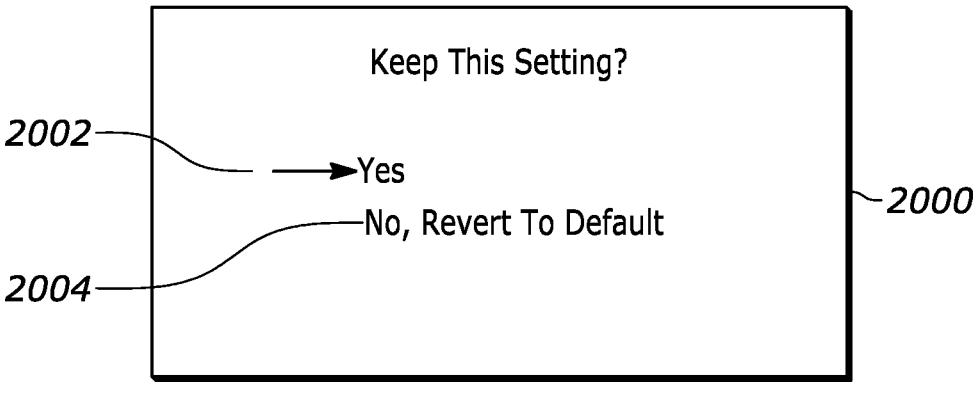
FIG. 20 illustrates an example UI for further selecting an audio profile.
Figure 21:
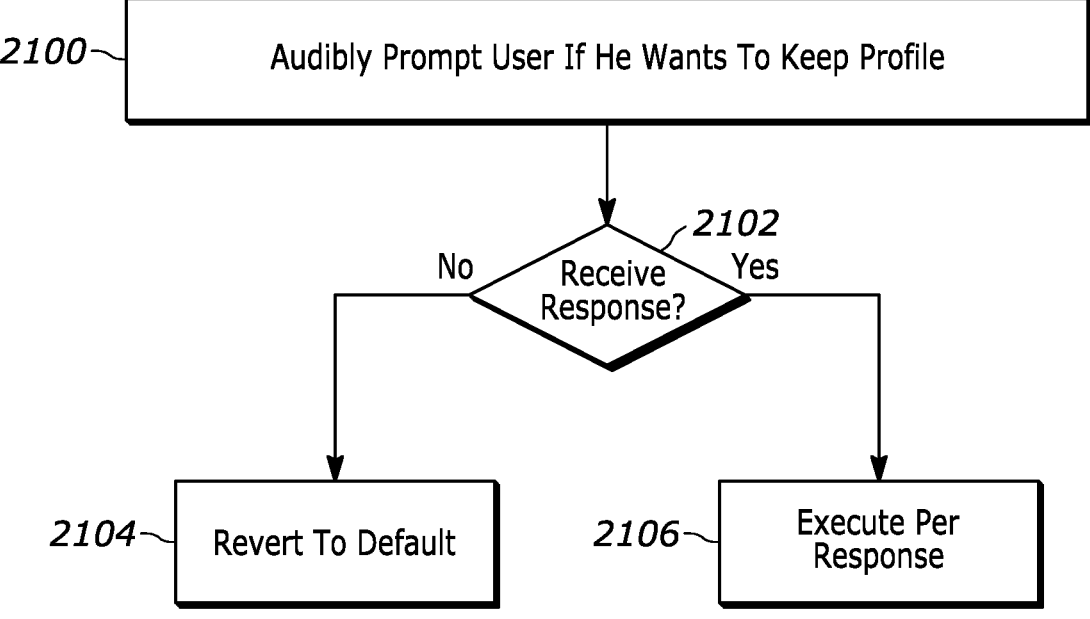
FIG. 21 illustrates example logic in example flow chart format for audible selection consistent with FIG. 20.

FIGS. 20 and 21 illustrate visible and audible techniques, respectively, for discarding an audio profile once selected, should the user have second thoughts. A prompt 2000 may be presented on any display herein asking if the user wants to keep a particular profile or a particular setting in the profile. The user can select to keep the profile or setting by selecting a selector 2002 or to discard the profile or stetting using a selector 2004.

FIG. 21 illustrates that a user can be audibly prompted at block 2100 to indicate whether the user wishes to keep the audio profile or setting. If an oral response is not received at block 2102, the audio profile or setting may be reset to a default profile or setting. On the other hand, if a response is received, the command uttered by the user is executed at block 2106 (i.e., to either keep or reject the setting or profile).

Figure 22:
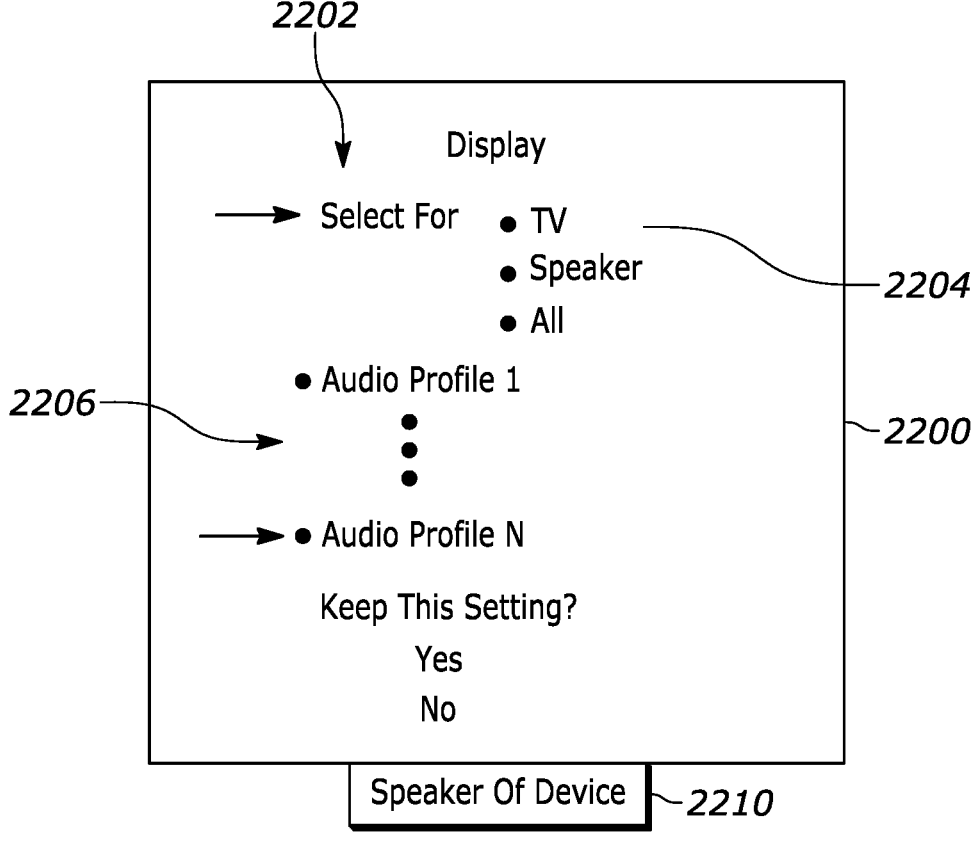
FIG. 22 illustrates an example screen shot of an example UI of another technique for selecting audio profiles.
Figure 22:
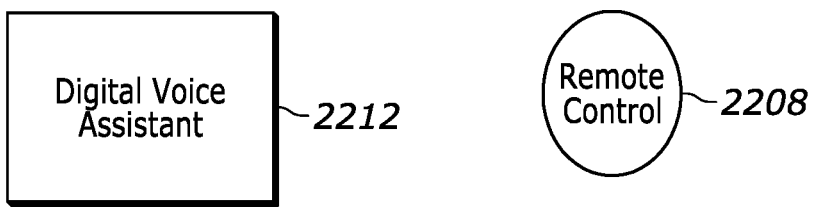

FIG. 22 illustrates that a display device 2200 such as any display device described herein may present a UI 2202 that may list 2204 various devices from which a user can select to apply an audio profile to, along with a list 2206 of audio profiles, e.g., hearing aid profile, TV internal speaker profile, TV external soundbar speaker profile, AV system—family room profile, AV system—rec room profile, headphones profile, etc. A user can select any of the devices and any of the profiles using an input device such as a remote control 2208 to cause demanded audio to be played on speakers 2210 of the selected device(s) according to the selected audio profile. Or, the UI 2202 may be audibly presented to the user using a digital voice assistant 2212 with user oral responses being received for applying orally selected audio profiles to orally selected devices.

Figure 23:
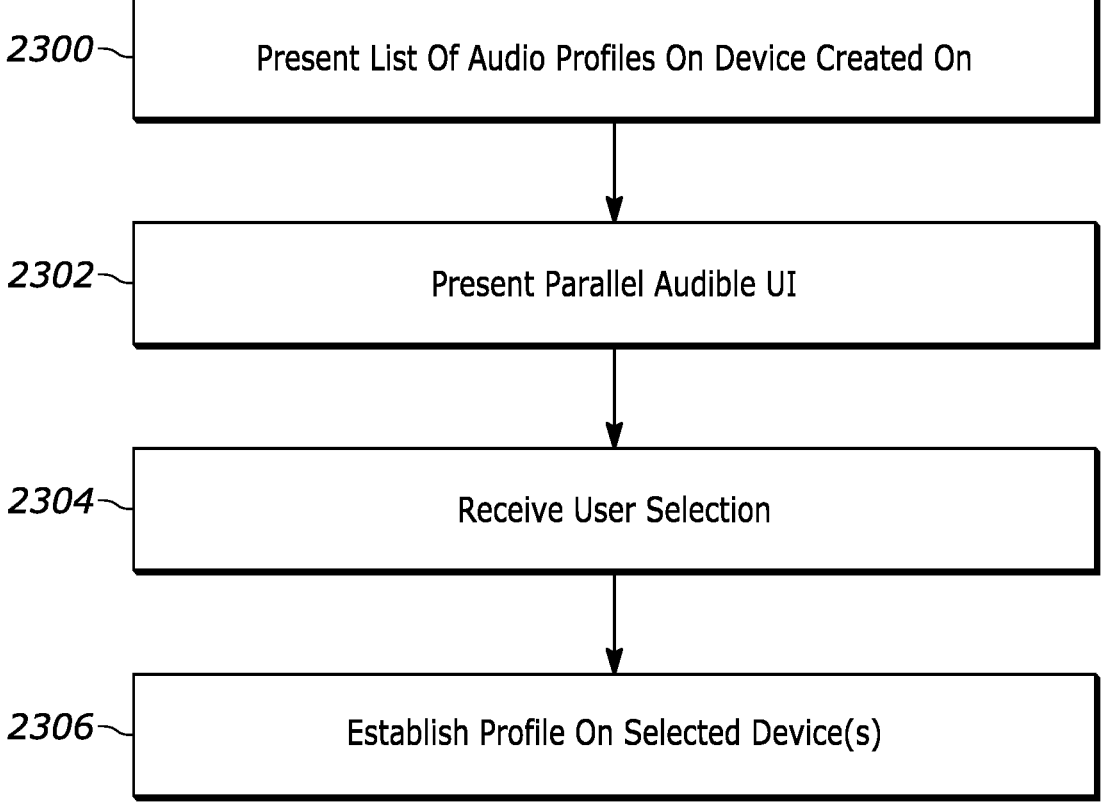
FIG. 23 illustrates example logic in example flow chart format for visible and audible selection of an audio profile using the device on which the profile was created.

FIG. 23 indicates at block 2300 that a list of audio profiles may be presented on the device on which the profiles were created, e.g., the phone 200 or the TV 206 or the audio speaker 208 in FIG. 2. It should be noted that there may be notable difference in the frequency responses of speakers in devices like the TV 206 or audio speaker 208. By taking the audio test using the device with which the audio will eventually be played back can overcome sonic speaker impairments. They can be compensated in the results of the hearing test and audio profile created. Likewise, creating an audio profile not only in the same environment of the playback device in situ, but also using the playback device itself can be compensated for in the audio profile making for more enjoyable listening. For example, some rooms have more softscape item such as curtains, carpets and furniture which will absorb higher frequency sound. An audio profile can be generated that will boost those frequencies even in a heavily furnished room. Moving to block 2302, the UI may be presented audibly in parallel to the visible list presented at block 2300. The user's oral or input device-implemented selection is received at block 2304 and the audio profile selected by the user is established on the device(s) selected by the user at block 2306.

Figure 24:
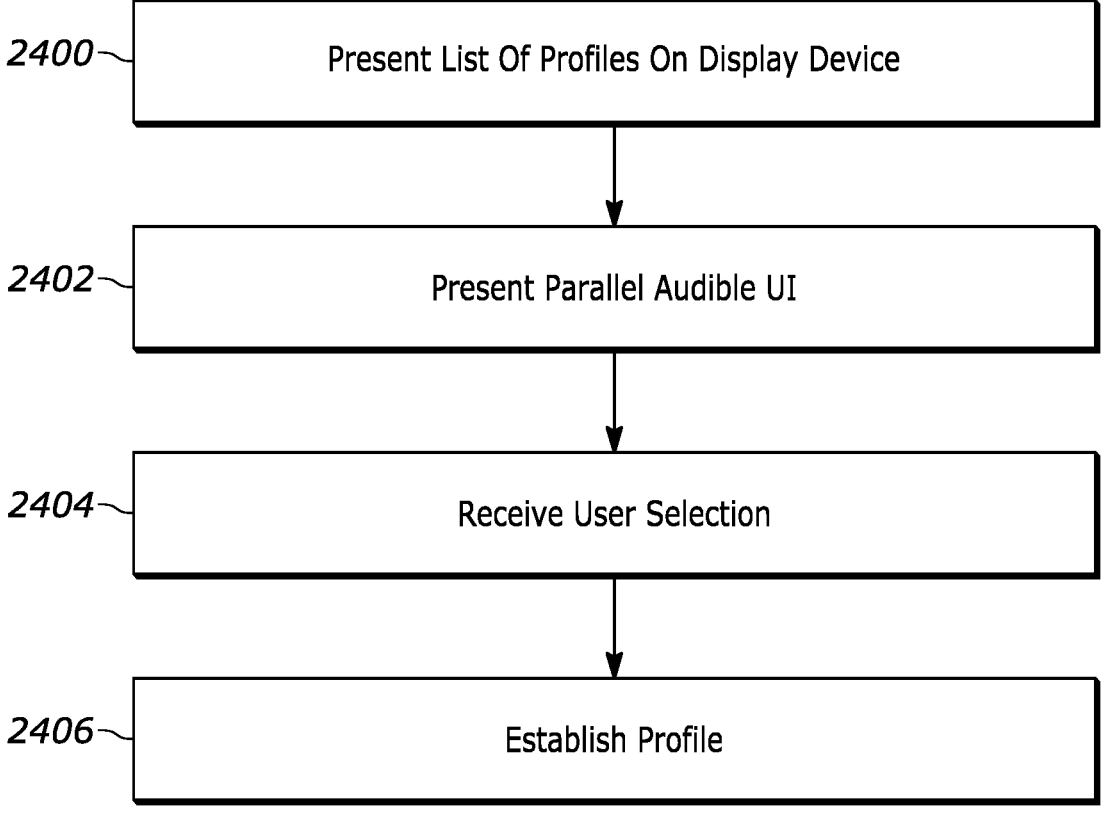

FIG. 24 indicates at block 2400 that a list of audio profiles may be presented on a device other than the device on which the profiles were created, e.g., the TV in FIG. 2. Moving to block 2402, the UI may be presented audibly in parallel to the visible list presented at block 2400. The user's oral or input device-implemented selection is received at block 2404 and the audio profile selected by the user is established on the device(s) selected by the user at block 2406.

Figure 25A:
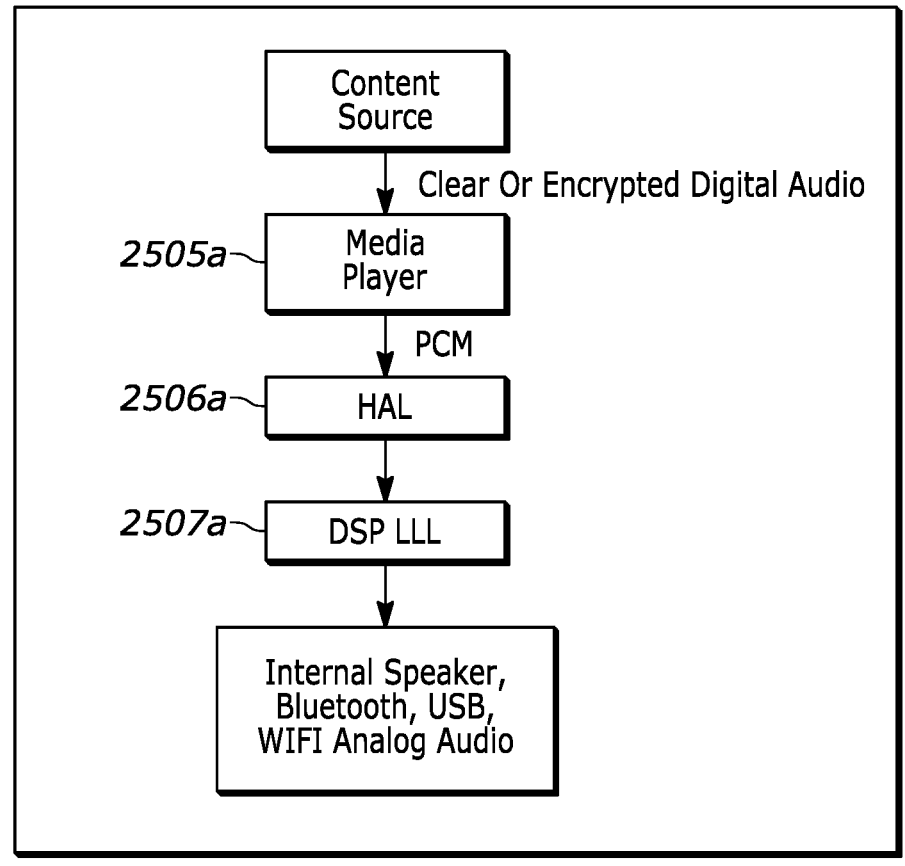
FIGS. 25*a*-25*d* illustrate techniques for generating audio profiles.
Figure 25B:
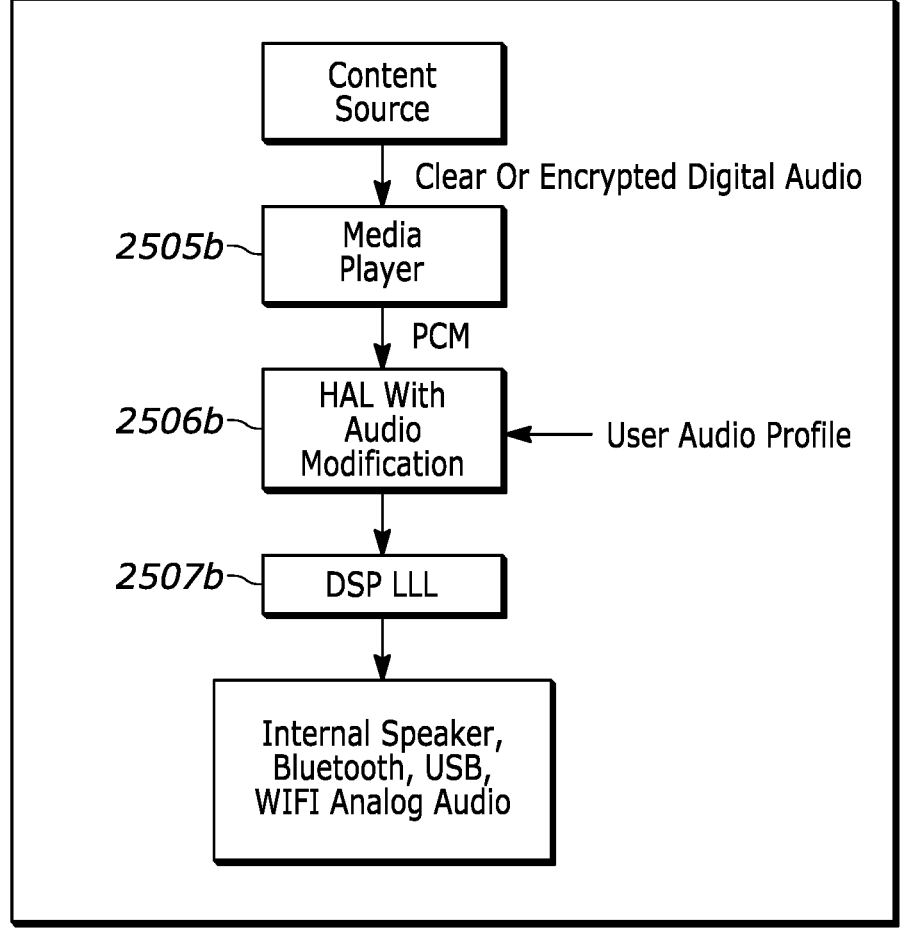
Figure 25C:
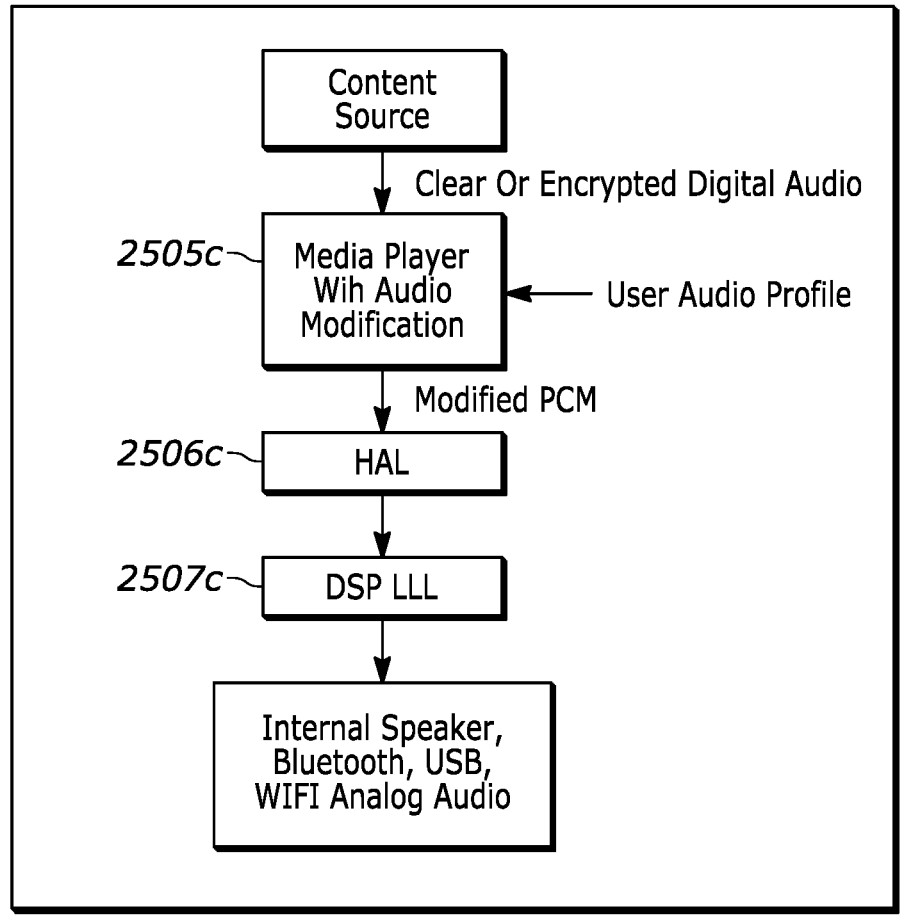
Figure 25D:
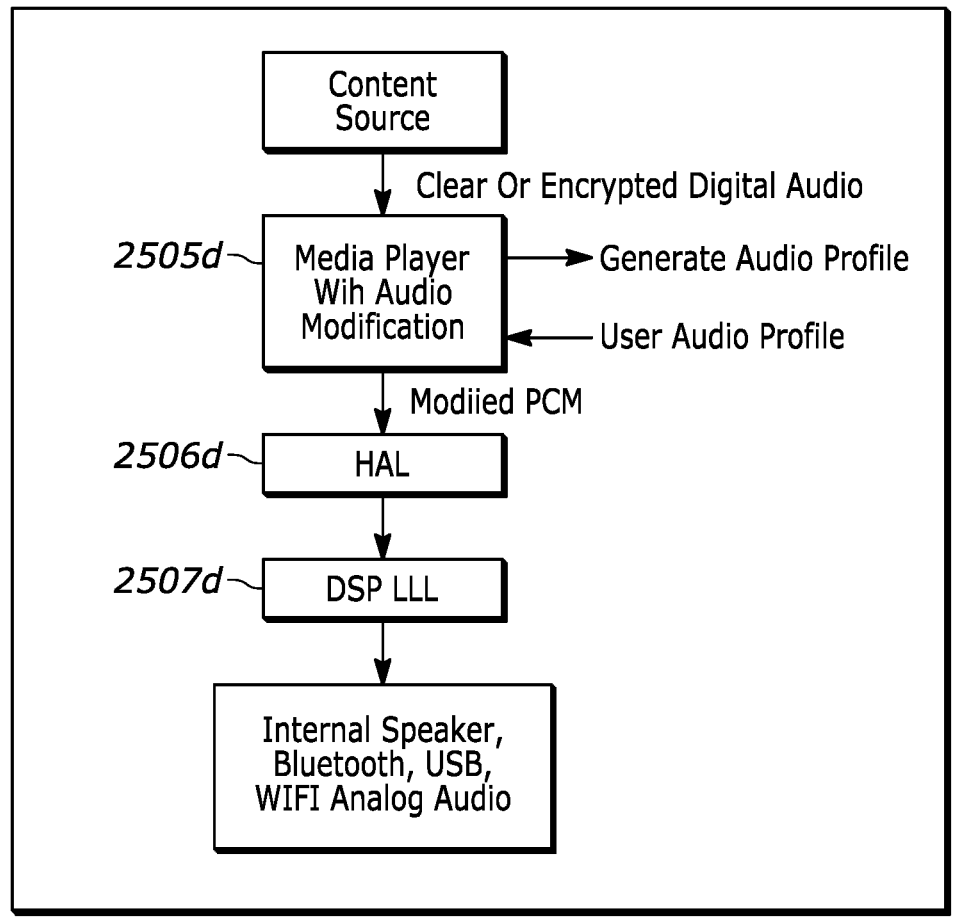

Turn now to FIGS. 25*a*, 25*b*, 25*c*, and 25*d*. In FIG. 25*a*, the media player 2505 (labeled 2505*a*-2505*d* in FIGS. 25*a-d*, respectively, as is the convention in these figures with the other components) receives content, and decrypts, if need be, and then decompresses the audio. MP3 audio Content from a personal library might not need to be decrypted. Likewise, in the US, over-the-air content is mostly un-encrypted. The clear and decompressed audio may be in PCM format. The media player would typically interface with a software layer often called the "hardware abstraction layer" (HAL) 2506 which handles the details regarding the lower software layers 2507 that communicates directly with the hardware. Now looking at FIG. 25*b*, we see that the hardware abstraction layer software has been modified to accept and audio profile. The HAL layer is now able to pass personalized audio to the digital signal processor (DSP) low level software. This embodiment is advantageous because an AVD device may have more than one media player, and so the audio from each can be personalized. Now looking at FIG. 25*c*, the media player 2505*c* itself is able to use an audio profile. It outputs modified PCM to the HAL. The HAL 2506*c* behaves similar to the HAL 2505*a*. It is agnostic to the personalized audio. Now turning to FIG. 25*d*, the media player application can be used to generate an audio profile. Therefore, a downloadable application can not only create the audio profile but then turn around and use it with the content it decodes.

Figure 26:
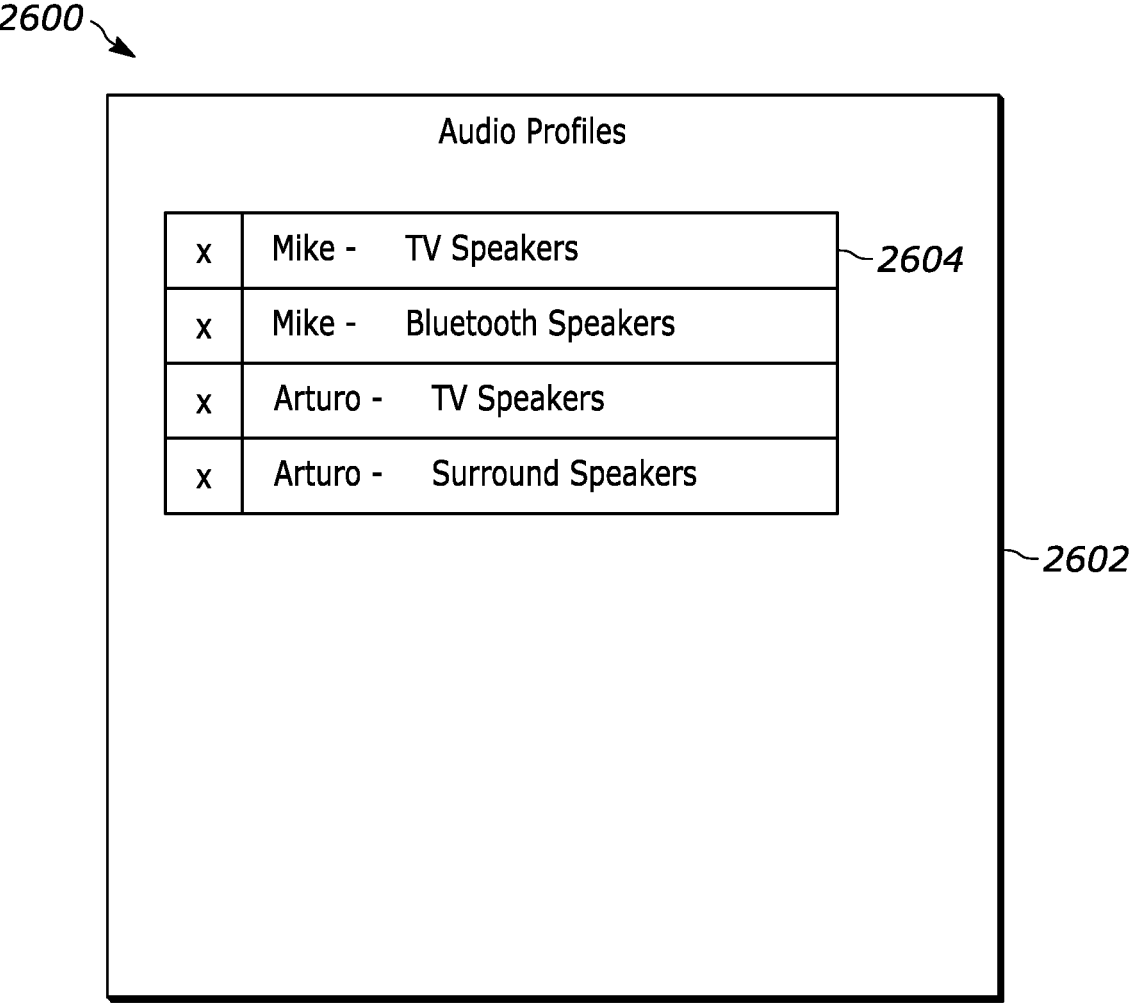
FIG. 26 illustrates a UI listing profiles.

A FIG. 26 shows a UI 2600 which is depicted as a visual UI on a display 2602 (which can also or alternatively be audible) The UI 2600 lists one or more audio profiles 2604 by username of the person to whom the profile has been tailored. As envisioned, the audio profiles could also be listed by the audio rendering path, e.g., internal speaker, Bluetooth speaker, USB speaker, WIFI speaker or analog audio speaker. A profile may be selected from the list, or personalization of audio profiles may be turned off. The UI can be generated as part of the generated system or as part of the media player 2505*d*.

While the particular embodiments are herein shown and described in detail, it is to be understood that the subject matter which is encompassed by the present invention is limited only by the claims.

What is claimed is:

1. An assembly, comprising:

at least one processor configured with instructions to:

execute an application (app) to present a prompt for a user to create an audio profile;

create the audio profile based on input from the user as provided in response to the prompt and based on a particular media player application that is to be used with the audio profile to present audio, wherein the audio profile is configured for use with the particular media player application, and wherein the audio profile is tailored to the user based on the input;

store the audio profile for retrieval to a playback apparatus in presenting demanded audio;

establish the audio profile in a hardware abstraction layer (HAL) of the playback apparatus;

based on establishment of the audio profile in the HAL, control the HAL to pass audio data modified by the HAL according to the audio profile to a digital signal processor (DSP) for rendering, by the DSP and using the particular media player application, of personalized audio indicated via the audio data; and control the DSP to drive a speaker of the playback apparatus to render the personalized audio.

2. The assembly of claim 1, wherein the playback apparatus comprises one or more of: a mobile phone, a headphone, a hearing aid.

3. The assembly of claim 1, wherein the playback apparatus comprises one or more of: a TV, a standalone speaker, an AV system.

4. The assembly of claim 1, wherein the apparatus is established by a computer game console.

5. The assembly of claim 1, wherein the at least one processor is configured with instructions to:

execute facial recognition to identify the user;

responsive to identification of the user via facial recognition, present a user interface (UI) on a display, the UI comprising an option that is selectable to load the audio profile from a cloud storage location.

6. The assembly of claim 5, comprising the display.

7. The assembly of claim 5, wherein the UI lists different audio profiles configured for outputting audio using different media player applications executable by the at least one processor.

8. The assembly of claim 7, wherein the option is a first option, wherein the audio profile is a first audio profile, and wherein the UI comprises second and third options that are different from the first option and different from each other, the second option being selectable to load a second audio profile from a connected device, the third option being selectable to load a third audio profile from internal storage of a computer game console.

9. A method comprising:

executing an application (app) to present a prompt for a user to create an audio profile;

creating the audio profile based on input from the user as provided in response to the prompt and based on a particular media player application that is to be used with the audio profile to present audio, wherein the audio profile is configured for use with the particular media player application, and wherein the audio profile is tailored to the user based on the input;

storing the audio profile for retrieval to a playback apparatus in presenting demanded audio;

establishing the audio profile in a hardware abstraction layer (HAL) of the playback apparatus;

based on establishment of the audio profile in the HAL, controlling the HAL to pass audio data modified by the HAL according to the audio profile to a digital signal processor (DSP) for rendering, by the DSP and using the particular media player application, of personalized audio indicated via the audio data; and controlling the DSP to drive a speaker of the playback apparatus to render the personalized audio.

10. The method of claim 9, wherein the method is executed at least in part by a computer game console.

11. The method of claim 9, comprising:

executing facial recognition to identify the user;

responsive to identification of the user via facial recognition, presenting a user interface (UI) on a display, the UI comprising an option that is selectable to load the audio profile from a cloud storage location.

12. The method of claim 11, wherein the UI lists different audio profiles configured for outputting audio using different media player applications.

13. The method of claim 12, wherein the option is a first option, wherein the audio profile is a first audio profile, and wherein the UI comprises second and third options that are different from the first option and different from each other, the second option being selectable to load a second audio profile from a connected device, the third option being selectable to load a third audio profile from internal storage of a computer game console.

14. An apparatus, comprising:

at least one computer storage that is not a transitory signal and that comprises instructions executable by at least one processor to:

execute an application (app) to present a prompt for a user to create an audio profile;

create the audio profile based on input from the user as provided in response to the prompt and based on a particular media player application that is to be used with the audio profile to present audio, wherein the audio profile is configured for use with the particular media player application, and wherein the audio profile is tailored to the user based on the input;

store the audio profile for retrieval to a playback apparatus in presenting demanded audio;

establish the audio profile in a hardware abstraction layer (HAL) of the playback apparatus;

based on establishment of the audio profile in the HAL, control the HAL to pass audio data modified by the HAL according to the audio profile to a digital signal processor (DSP) for rendering, by the DSP and using the particular media player application, of personalized audio indicated via the audio data; and control the DSP to drive a speaker of the playback apparatus to render the personalized audio.

15. The apparatus of claim 14, wherein the apparatus is established by a computer game console.

16. The apparatus of claim 14, wherein the instructions are executable to:

execute facial recognition to identify the user;

responsive to identification of the user via facial recognition, present a user interface (UI) on a display, the UI comprising an option that is selectable to load the audio profile from a cloud storage location.

17. The apparatus of claim 16, wherein the UI lists different audio profiles configured for outputting audio using different media player applications executable by the at least one processor.

18. The apparatus of claim 17, wherein the option is a first option, wherein the audio profile is a first audio profile, and wherein the UI comprises second and third options that are different from the first option and different from each other, the second option being selectable to load a second audio profile from a connected device, the third option being selectable to load a third audio profile from internal storage of a computer game console.

19. The apparatus of claim 14, comprising the at least one processor.

\* \* \* \* \*